(12) United States Patent
Ito

(10) Patent No.: US 10,116,179 B2
(45) Date of Patent: Oct. 30, 2018

(54) THREE-PHASE ALTERNATING CURRENT MOTOR

(71) Applicant: FANUC CORPORATION, Yamanashi (JP)

(72) Inventor: Takashi Ito, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 106 days.

(21) Appl. No.: 15/045,585

(22) Filed: Feb. 17, 2016

(65) Prior Publication Data

US 2016/0241100 A1 Aug. 18, 2016

(30) Foreign Application Priority Data

Feb. 18, 2015 (JP) .................................. 2015-030011

(51) Int. Cl.
*H02K 3/12* (2006.01)
*H02K 3/28* (2006.01)

(52) U.S. Cl.
CPC ........... *H02K 3/28* (2013.01); *H02K 2213/03* (2013.01)

(58) Field of Classification Search
CPC .. H02K 3/28; H02K 3/04; H02K 3/14; H02K 2213/03
USPC ......................... 310/207, 203, 195, 204, 205
See application file for complete search history.

(56) References Cited

U.S. PATENT DOCUMENTS

| 6,515,393 | B2 * | 2/2003 | Asao | H02K 3/28 310/179 |
| 6,710,501 | B1 * | 3/2004 | Kusumoto | H02K 1/16 310/201 |
| 7,432,626 | B2 * | 10/2008 | Neet | H02K 1/165 310/179 |
| 7,830,060 | B2 * | 11/2010 | Miyata | H02K 3/28 310/179 |

(Continued)

FOREIGN PATENT DOCUMENTS

| GB | 587525 | * | 4/1947 |
| JP | 5060701 A | | 5/1975 |

(Continued)

OTHER PUBLICATIONS

English Abstract for International Publication No. WO2013/145977 A1, published Oct. 3, 2013, 1 pg.

(Continued)

*Primary Examiner* — Bernard Rojas
*Assistant Examiner* — Ahmed Elnakib
(74) *Attorney, Agent, or Firm* — Fredrikson & Byron, P.A.

(57) ABSTRACT

In a three-phase AC motor, when 2P represents the number of poles of a rotor and N represents the number of slots for inserting windings of a stator therethrough, the division of N by P is not an integer. When X represents the quotient of the division of N by 2P, the stator includes a first annular winding portion made of one coil wound by wave winding at a slot pitch of X or X+1 through the slots, a second annular winding portion wound in the same slot pitch as the first annular winding portion in such a position as not to completely overlap the first annular winding portion, and a plurality of third winding portions each made of the winding wound around the two slots. The first and second annular (Continued)

winding portions and the plurality of third winding portions are connected in series on a phase-by-phase basis.

3 Claims, 11 Drawing Sheets

(56) References Cited

U.S. PATENT DOCUMENTS

| | | | | |
|---|---|---|---|---|
| 7,911,105 B2* | 3/2011 | Neet | ......................... | H02K 3/14 310/184 |
| 8,008,830 B2* | 8/2011 | Kouda | ..................... | H02K 3/12 310/201 |
| 8,598,765 B2* | 12/2013 | Kashihara | ................ | H02K 3/28 310/207 |
| 2013/0221793 A1* | 8/2013 | Minoshima | .............. | H02K 3/28 310/207 |
| 2017/0179782 A1* | 6/2017 | Ito | ............................ | H02K 3/12 |

FOREIGN PATENT DOCUMENTS

| | | |
|---|---|---|
| JP | 573348 U | 1/1982 |
| JP | 2001238414 A | 8/2001 |
| JP | 2002165396 A | 6/2002 |
| JP | 2009540781 A | 11/2009 |
| JP | 2013183492 A | 9/2013 |
| WO | 2013145977 A1 | 10/2013 |

OTHER PUBLICATIONS

English Abstract for Japanese Publication No. 2009-540781 A, published Nov. 19, 2009, 1 pg.
English Abstract for Japanese Publication No. 57-003348 U, published Jan. 8, 1982, 2 pgs.
English Abstract for Japanese Publication No. 50-60701 A, published May 24, 1975, 1 pg.
Untranslated Decision to Grant a Patent mailed by Japan Patent Office (JPO)) for Application No. JP 2015-030011, dated Mar. 14, 2017, 3 pages.
English machine translation of Decision to Grant a Patent mailed by Japan Patent Office (JPO) for Application No. JP 2015-030011, dated Mar. 14, 2017, 3 pages.
English Abstract and Machine Translation for Japanese Publication No. 2013-183492 A, published Sep. 12, 2013, 22 pgs.
English Abstract and Machine Translation for Japanese Publication No. 2002-165396 A, published Jun. 7, 2002, 31 pgs.
English Abstract and Machine Translation for Japanese Publication No. 2001-238414 A, published Aug. 31, 2001, 11 pgs.

* cited by examiner

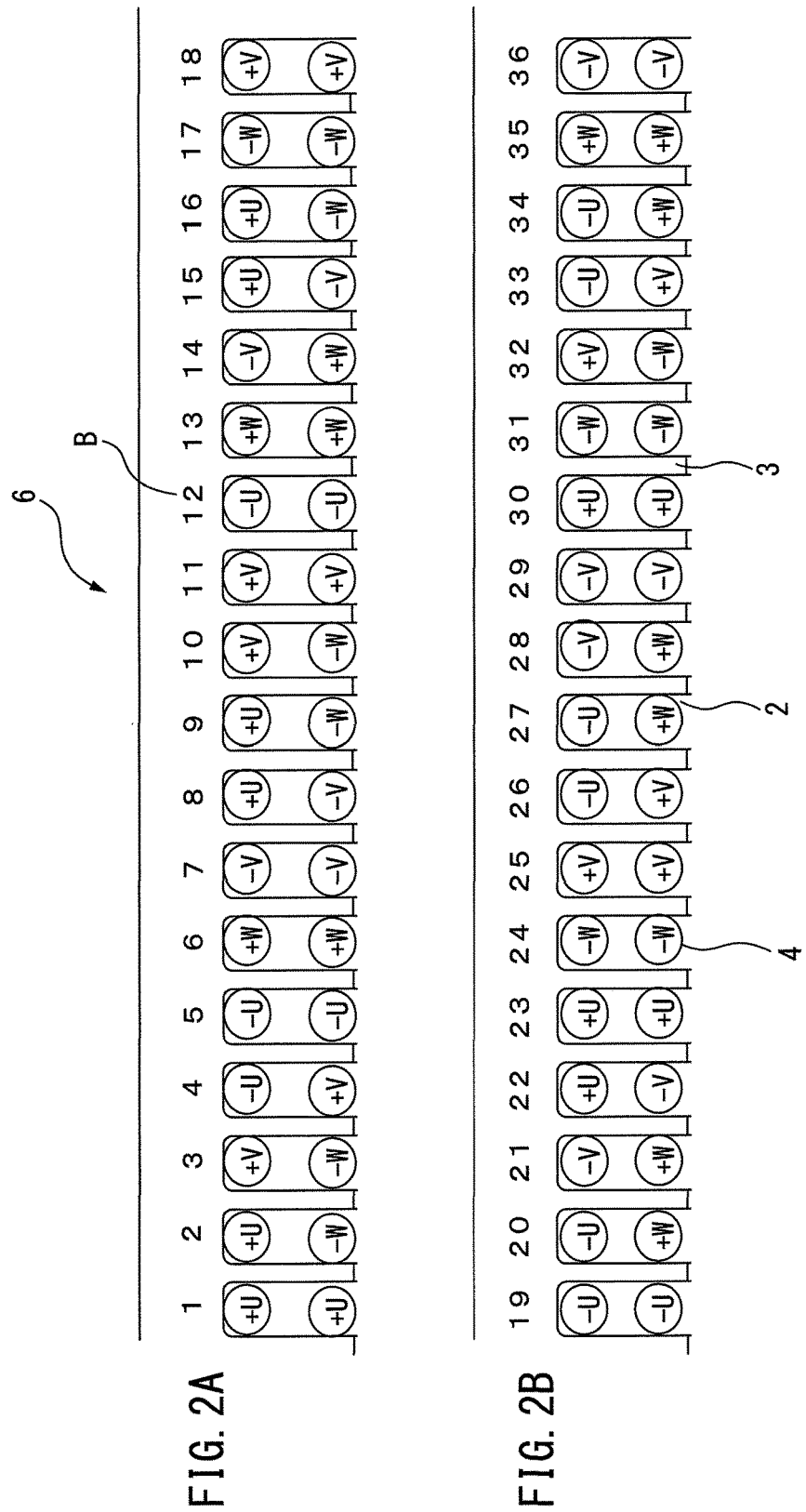

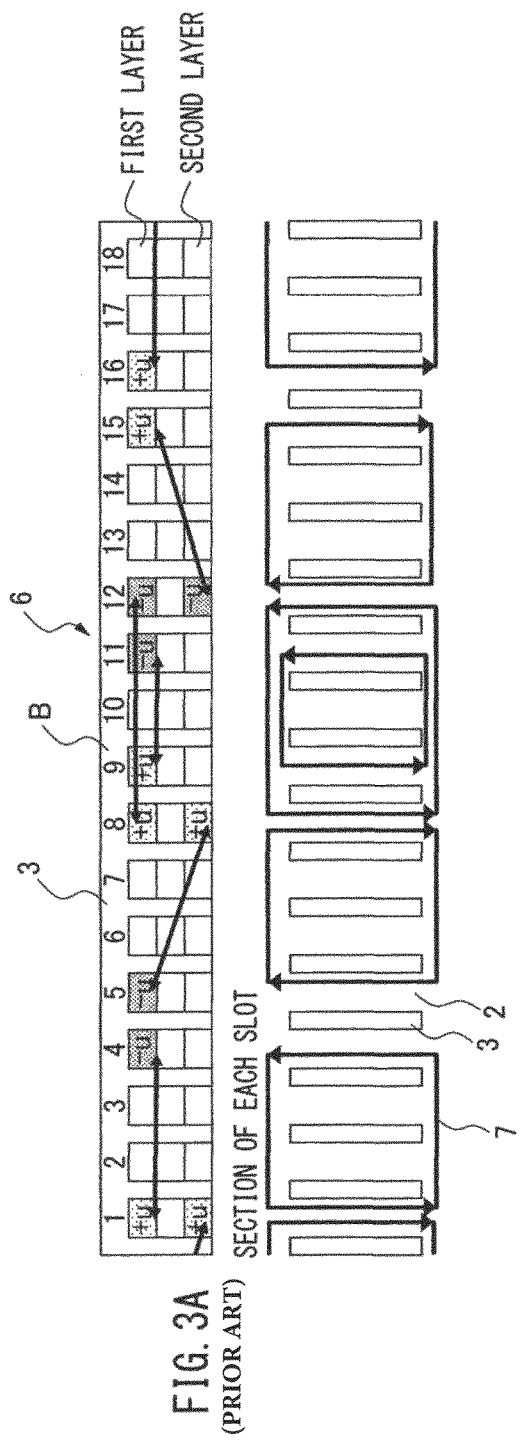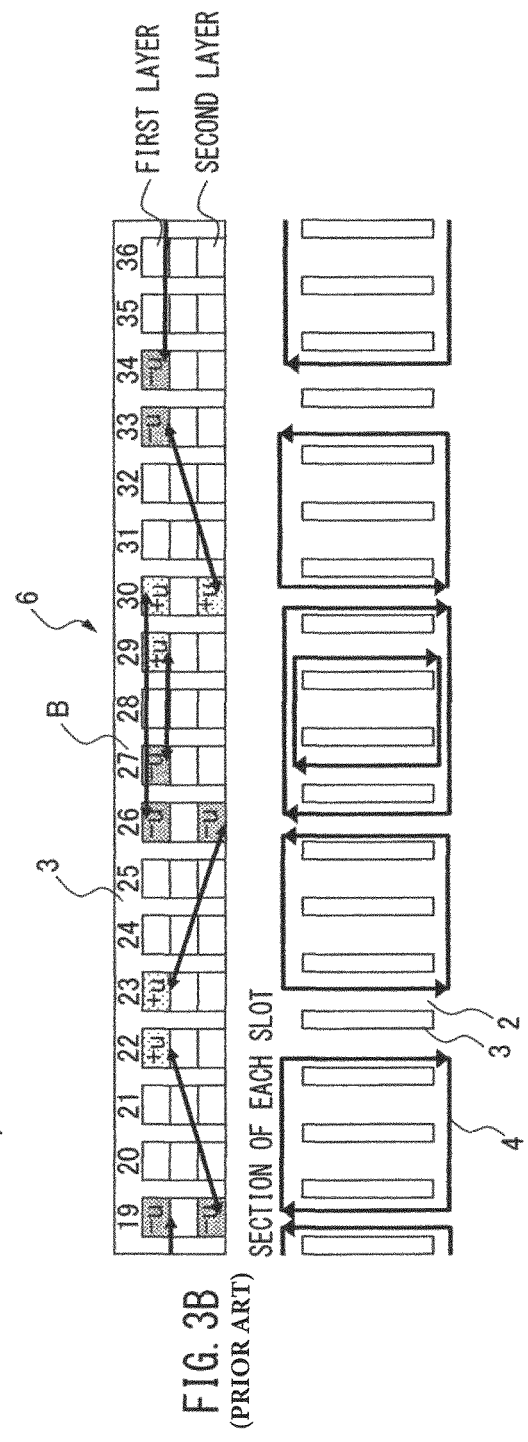
FIG. 3A (PRIOR ART)
FIG. 3B (PRIOR ART)

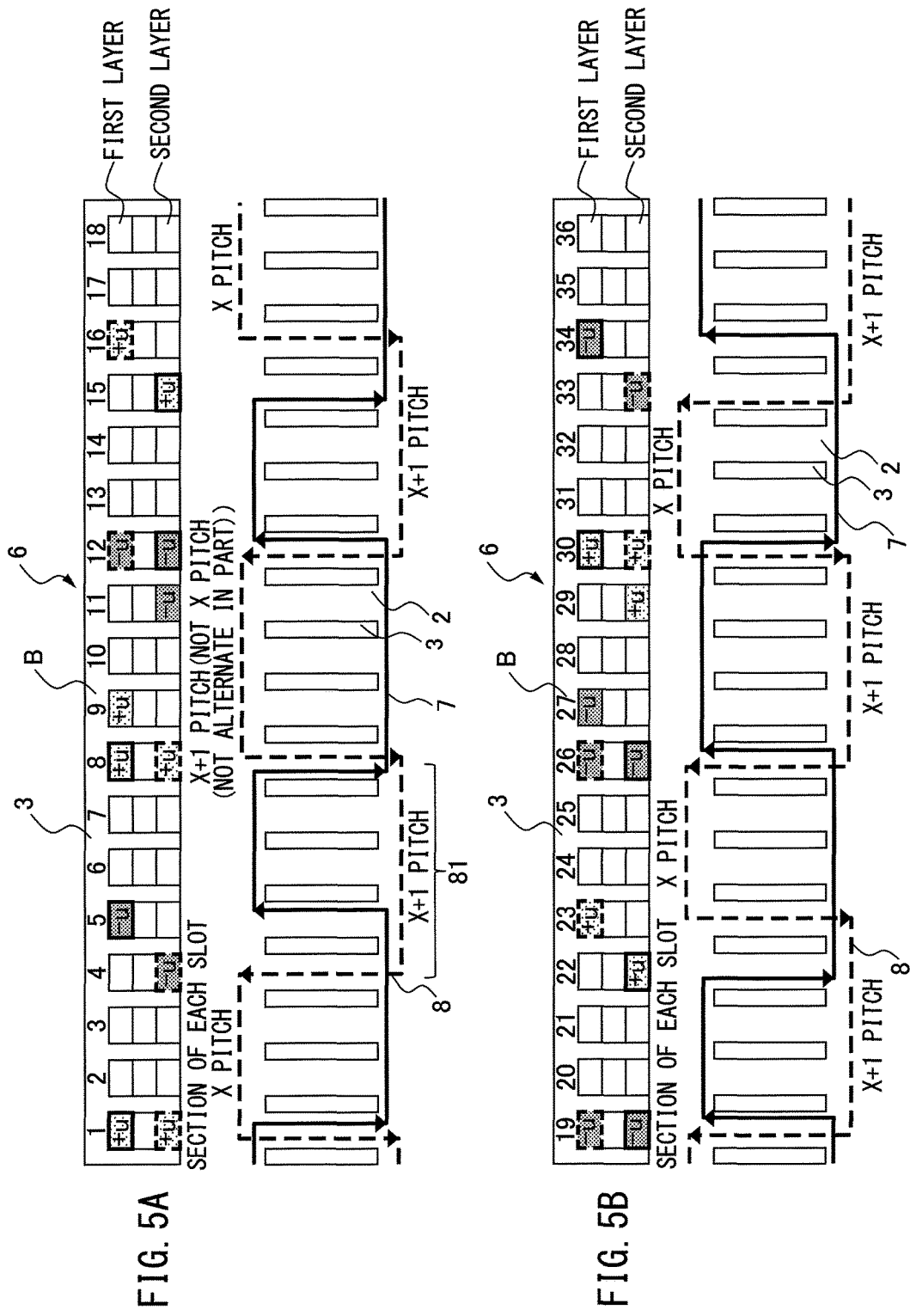

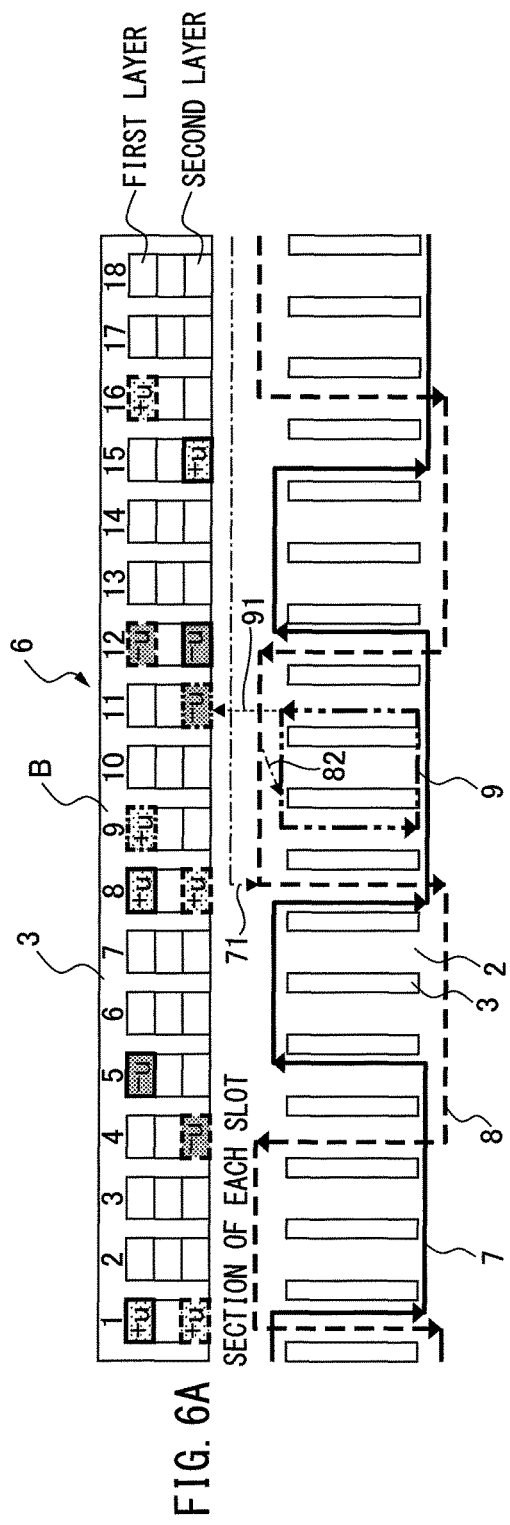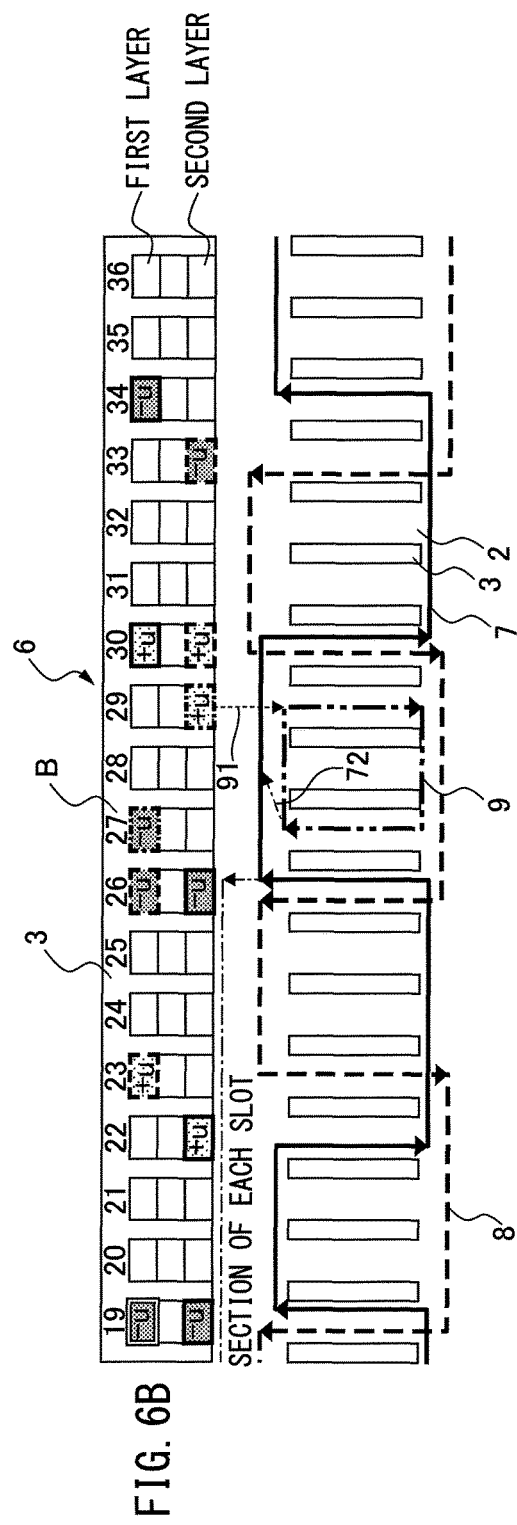

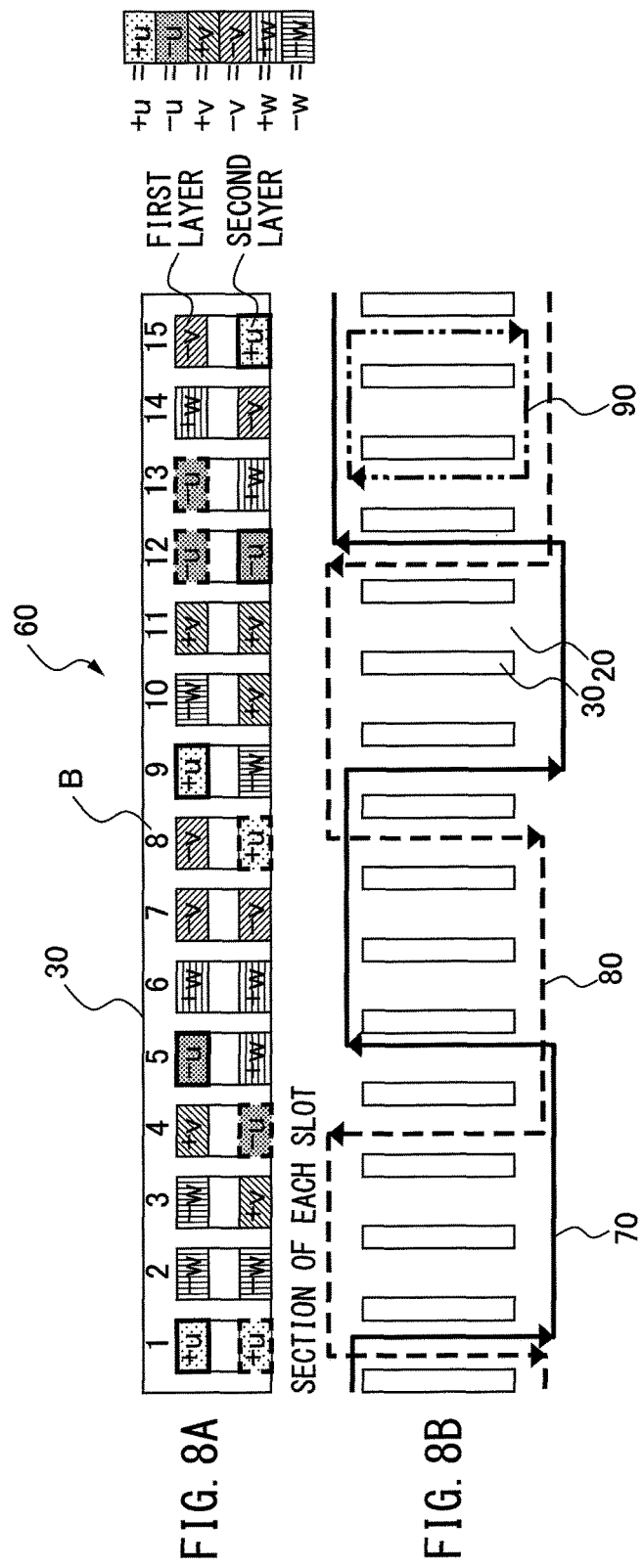

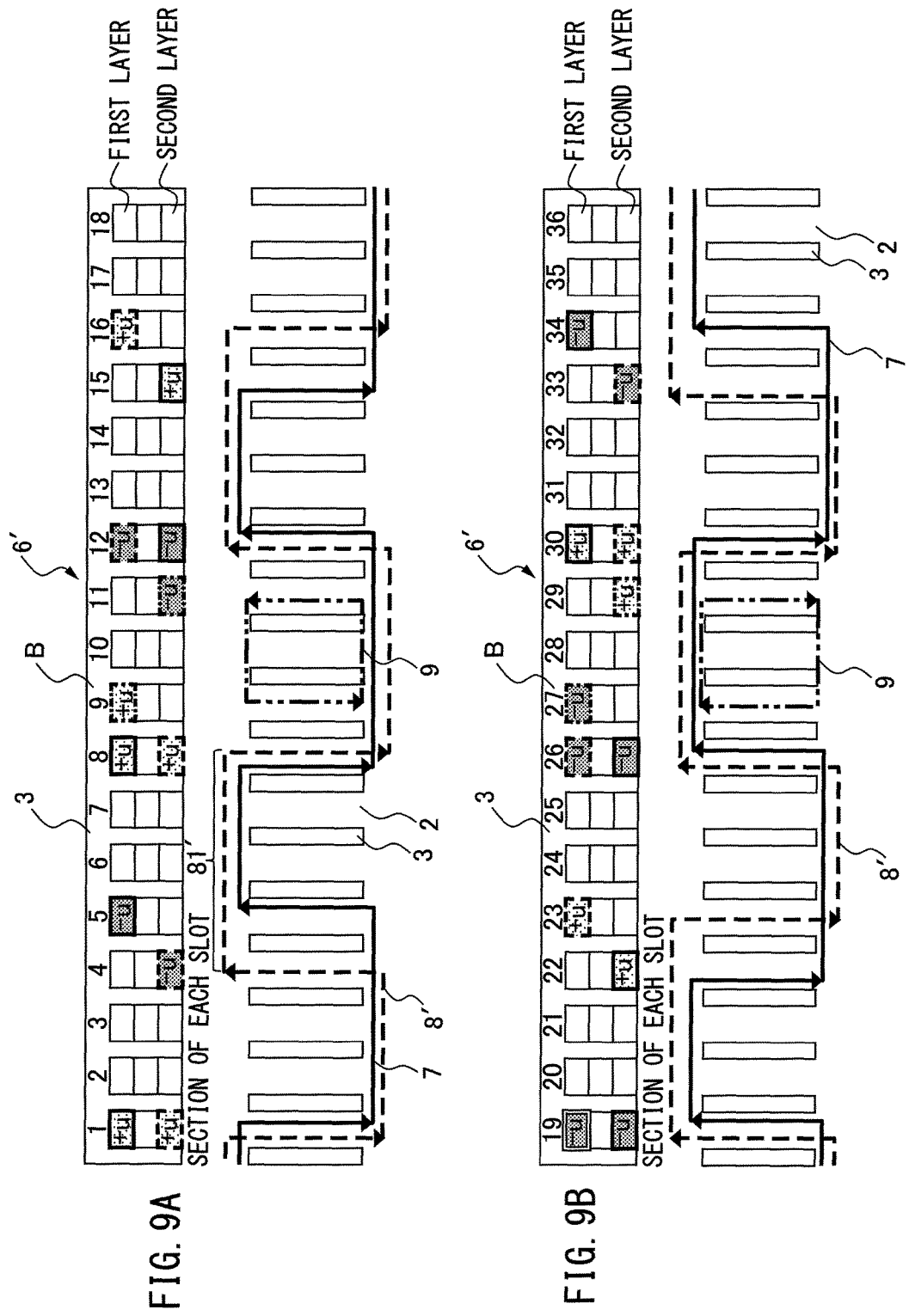

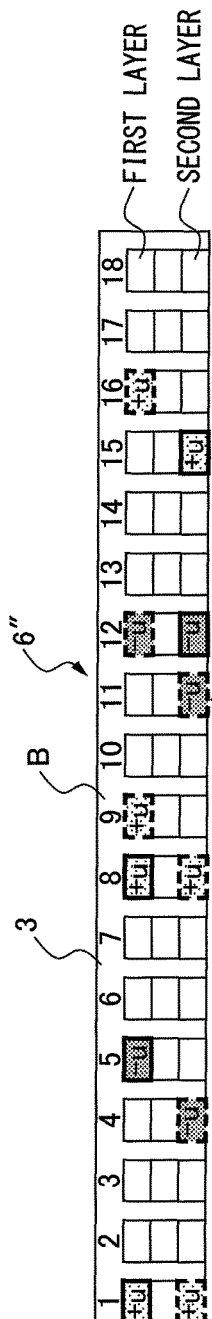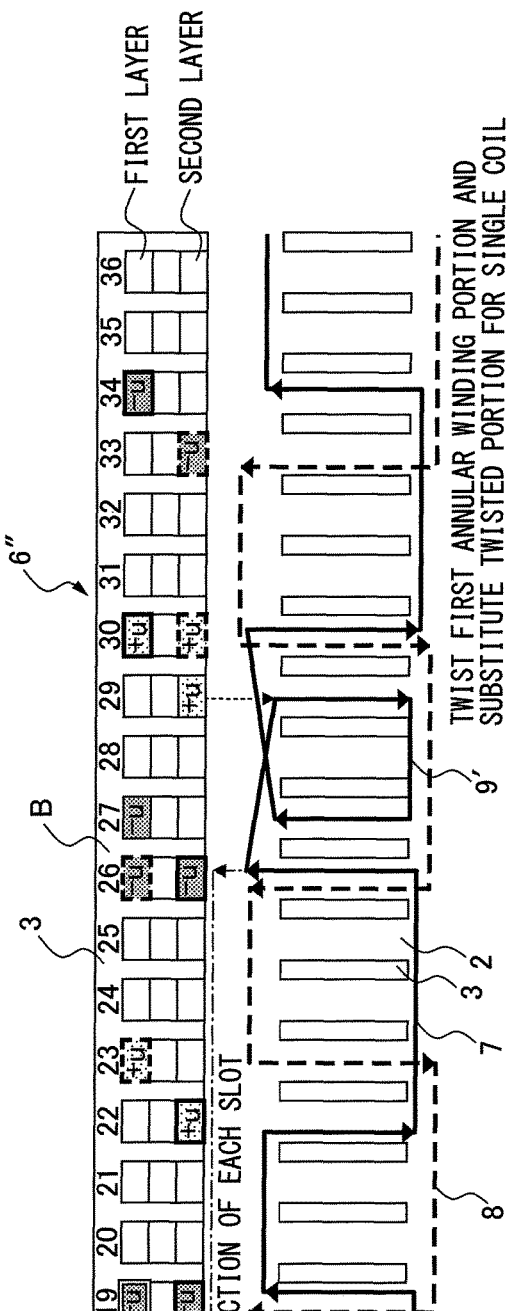
FIG. 10A
FIG. 10B

THREE-PHASE ALTERNATING CURRENT MOTOR

BACKGROUND OF THE INVENTION

1. Field of the Invention

The present invention relates to a three-phase alternating current motor, and more specifically relates to, in fractional-slot motors having complicated winding arrangements, a three-phase alternating current motor having a wave winding configuration.

2. Description of Related Art

Conventionally, there are known fractional-slot motors in which the division of a slot number by a pole number is a fraction in lowest terms, as a combination of the pole number and the slot number that allows a reduction in torque ripple of the motor.

In the fractional-slot motors, the pole number and the slot number can be determined such that the pole number and the slot number have a high least common multiple and a high-order distributed winding factor is lowered. Therefore, the torque ripple can be reduced.

Also, in the fractional-slot motors having a slot number, i.e., three or more times higher than the number of pole pairs, although the torque ripple tends to decrease, a coil pitch of windings to be inserted into slots is larger than one slot (the distance between the adjoining slots) and hence only distributed winding is available. Especially, motors in which the division of a slot number by the number of pole pairs is a fraction in lowest terms each have a complicated winding configuration and an increased number of coils of windings to be inserted into slots, thus being unsuitable for automation of a winding step in manufacture.

The increased number of coils requires long coil ends, in order to avoid interference among the coils or interpose interphase insulating sheets each between the coils. The long coil ends cause an increase in the dimensions of a motor body. Also, the long coil ends increase the windings in length, thus causing an increase in a winding resistance of each phase.

Furthermore, the increased number of coils increases the number of connecting wires between the coils, thus causing complicated intertwinement of the windings with each other.

As an example of methods for manufacturing stators of motors, there is known a manufacturing method using an automatic winding machine having an inserter (For example, Japanese Unexamined Patent Publication (Kokai) Nos. 2013-183492, 2002-165396, and 2001-238414). In this method, a plurality of coils is manufactured by turning nozzles or fliers of the winding machine about spools. The manufactured coils are inserted into the inserter, and the inserter is gradually inserted into a stator so that the coils are wound in the stator. In this process, an increase in the number of coils to be manufactured increases the number of insertions into the inserter, and thus significantly increases the number of manufacturing steps. Also, since a lot of coils are inserted into the inserter, when there are a number of connecting wires between the coils, windings may be complicatedly intertwined and cause a manufacturing failure.

The manufacturing method using the inserter has the following problems.

Fractional-slot winding motors having complicated winding configurations are difficult to be manufactured by automatic winding and require a number of manufacturing steps.

An increase in the number of coils increases overlaps of the coils and increases the length of coil ends.

An increase in the number of coils increases the number of connecting wires between the coils and causes complication.

SUMMARY OF THE INVENTION

An object of the present invention is to provide, in fractional-slot motors having complicated winding arrangements, a wave winding motor that has a winding configuration requiring a small number of manufacturing steps, a small number of connecting wires between coils, and small coil ends.

A three-phase alternating current (AC) motor according to one embodiment of the present invention includes a rotor, a stator, and a plurality of windings. The rotor has a plurality of pairs of magnetic poles. The stator has a plurality of slots each formed in the direction of a rotation axis of the rotor and arranged in a circumferential direction. The stator is disposed opposite the rotor in a radial direction. The plurality of windings is wound in the stator so as to be inserted into the slots. When 2P represents the number of the poles of the rotor of the motor and N represents the number of the slots for inserting the windings of the stator therethrough, the division of the slot number N by the number of the pole pairs P is not an integer. X represents the quotient of the division of the slot number N of the stator by the number of the poles 2P. The stator includes a first annular winding portion, a second annular winding portion, and a plurality of third winding portions. The first annular winding portion is made of one coil, i.e., wound a predetermined number of turns more largely than the inner diameter of the stator by the winding of each phase. The first annular winding portion is wound 360 degrees in the circumferential direction through the slots by wave winding at a slot pitch of X or X+1. The second annular winding portion is made of another coil, i.e., wound in a like manner as the first annular winding portion by the wave winding at a slot pitch of X or X+1. The second annular winding portion is wound 360 degrees through the slots in such a position as not to completely overlap the first annular winding portion by being shifted in the circumferential direction. The plurality of third winding portions is each made of the winding wound around two of the slots. The three-phase AC motor according to the embodiment of the present invention is characterized in that the first annular winding portion, the second annular winding portion, and the plurality of third winding portions are connected in series on a phase-by-phase basis.

BRIEF DESCRIPTION OF THE DRAWINGS

The objects, features, and advantages of the present invention will be more apparent from the following description of embodiments in conjunction with the attached drawings, wherein:

FIG. 2A is a developed sectional view of a winding arrangement of the ten-pole thirty-six-slot motor at slot identification numbers 1 to 18;

FIG. 2B is a developed sectional view of the winding arrangement of the ten-pole thirty-six-slot motor at slot identification numbers 19 to 36;

FIG. 3A is a developed sectional view of a winding arrangement at slot identification numbers 1 to 18 in the case of winding U-phase coils by concentric winding in a motor having a pole number of 10, a slot number of 36, and a shift number of 3;

FIG. 3B is a developed sectional view of the winding arrangement at slot identification numbers 19 to 36 in the case of winding the U-phase coils by the concentric winding in the motor having a pole number of 10, a slot number of 36, and a shift number of 3;

FIG. 5A is a developed sectional view of the winding arrangement at the slot identification numbers 1 to 18, in the case of applying a second annular winding portion to the ten-pole thirty-six-slot wave winding in the three-phase AC motor according to the first embodiment of the present invention;

FIG. 5B is a developed sectional view of the winding arrangement at the slot identification numbers 19 to 36, in the case of applying the second annular winding portion to the ten-pole thirty-six-slot wave winding in the three-phase AC motor according to the first embodiment of the present invention;

FIG. 6A is a developed sectional view of the winding arrangement at the slot identification numbers 1 to 18, in the case of applying a third winding portion to the ten-pole thirty-six-slot winding arrangement in the three-phase AC motor according to the first embodiment of the present invention;

FIG. 6B is a developed sectional view of the winding arrangement at the slot identification numbers 19 to 36, in the case of applying another third winding portion to the ten-pole thirty-six-slot winding arrangement in the three-phase AC motor according to the first embodiment of the present invention;

FIG. 8A is a developed sectional view taken along a cross section perpendicular to a rotation axis of a rotor, in a case where the first annular winding portion, the second annular winding portion, and the third winding portion are applied to a four-pole fifteen-slot winding arrangement in the three-phase AC motor according to the first embodiment of the present invention;

FIG. 8B is a drawing showing the positional relationship among coils and slots viewed from the rotation axis of the rotor, in a case where the first annular winding portion, the second annular winding portion, and the third winding portion are applied to the four-pole fifteen-slot winding arrangement in the three-phase AC motor according to the first embodiment of the present invention;

FIG. 9A is a developed sectional view of a winding arrangement at the slot identification numbers 1 to 18, in the case of inverting the orientation of crossover portions of the second annular winding portion in a three-phase AC motor according to a second embodiment of the present invention;

FIG. 9B is a developed sectional view of the winding arrangement at the slot identification numbers 19 to 36, in the case of inverting the orientation of the crossover portions of the second annular winding portion in the three-phase AC motor according to the second embodiment of the present invention;

FIG. 10A is a developed sectional view of a winding arrangement at the slot identification numbers 1 to 18, in the case of applying another third winding portion to the ten-pole thirty-six-slot winding arrangement in a three-phase AC motor according to a third embodiment of the present invention;

FIG. 10B is a developed sectional view of the winding arrangement at the slot identification numbers 19 to 36, in the case of applying another third winding portion to the ten-pole thirty-six-slot winding arrangement in the three-phase AC motor according to the third embodiment of the present invention;

DETAILED DESCRIPTION OF THE INVENTION

A three-phase alternating current motor according to the present invention will be described below with reference to the drawings.

First Embodiment

Figure 1:
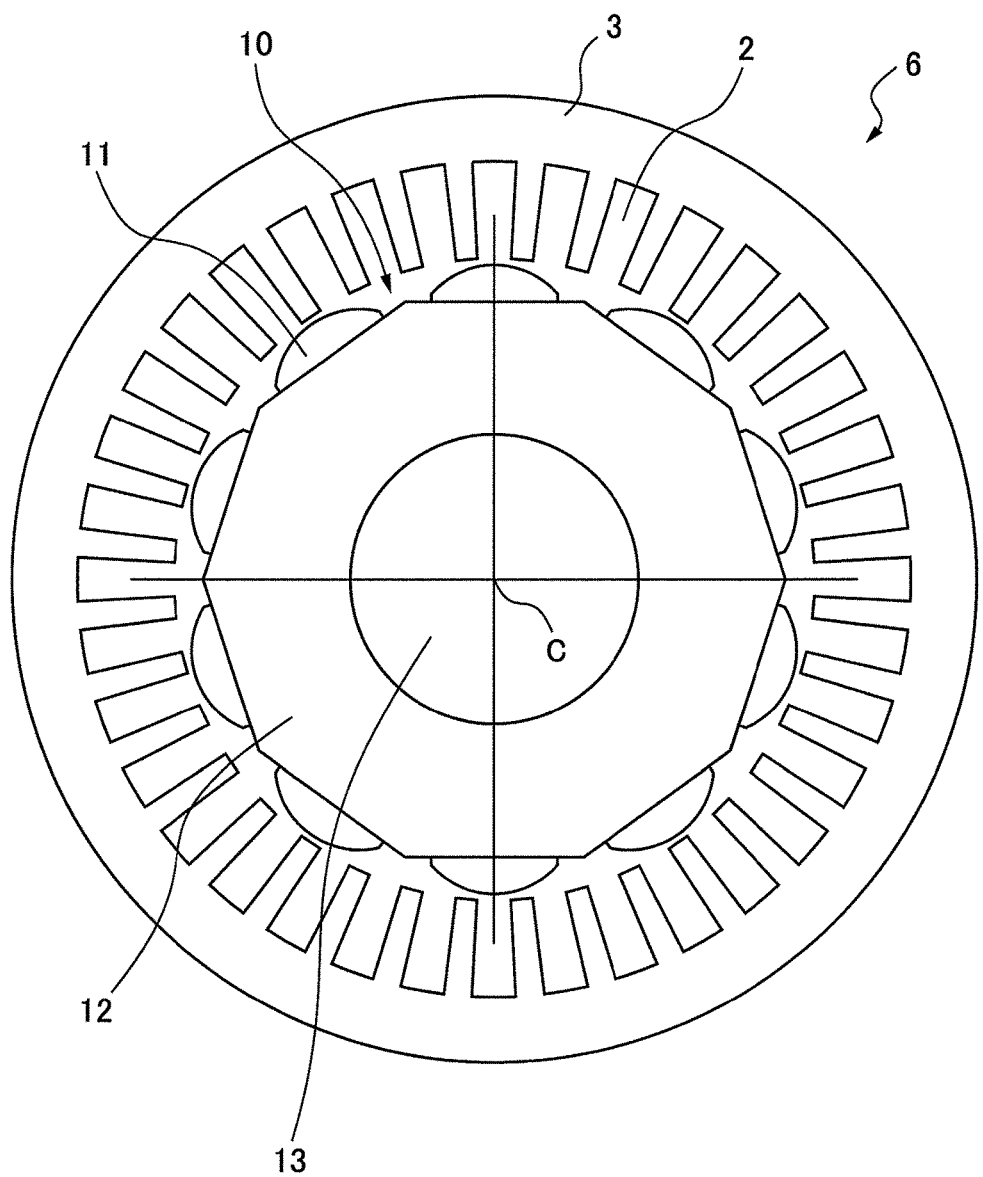
FIG. 1 is a cross sectional view of a ten-pole thirty-six-slot motor.

A three-phase alternating current (AC) motor according to a first embodiment of the present invention will be described. FIG. 1 is a cross sectional view of a ten-pole thirty-six-slot motor. In FIG. 1, reference numeral 6 indicates a stator, and reference numeral 10 indicates a rotor. The rotor 10 is provided with ten magnets 11, a rotor core 12, and a rotor shaft 13. The rotor 10 rotates about a rotation axis C of the rotor. The number of magnetic poles P is ten, which is the same as the number of magnets. The stator 6 is provided with a stator core 3 and thirty-six slots 2 that are each formed in the direction of the rotation axis C of the rotor and arranged in a circumferential direction. In the slots 2, windings are disposed as described later. Since the present invention relates to the arrangement of the windings wound in the stator core 3 of the motor, the description of the rotor will be omitted below. FIGS. 2A and 2B show the arrangement of coils of individual phases in slots of a fractional-slot motor having a pole number of 10, a slot number of 36, and a shift number of 3. Reference numeral 2 indicates the slots of a stator core, reference numeral 3 indicates the stator core, reference numeral 4 indicates windings (coils), and reference numeral 6 indicates a stator. Symbol B at the top of each slot 2 indicates slot identification numbers. "U", "V", and "W" represent the phases of a three-phase alternating current, which are ±120° out of phase with each other. "+" and "−" represent the directions of the current, which are ±180° out of phase with each other. FIGS. 2A and 2B show an example of a two-layer winding arrangement, in which the windings of any of six phases in total, i.e., +U, −U, +V, −V, +W, and −W phases are disposed two by two in each slot. In each arrangement of the slot, the same number of conductive wires e.g. copper wires are inserted. The stator 6 is originally cylindrical in shape, but for the sake of explanation, is illustrated in the developed sectional views in which the cylindrical stator 6 is developed in a linear manner. The arrangement of the windings 4 in the stator 6 will be hereinafter described with reference to the developed sectional views. It is noted that FIG. 2A shows a cross section of the slots 2 indicated with the slot identification numbers 1 to 18 of the developed stator 6, and FIG. 2B shows a cross section of the slots 2 indicated with the slot identification numbers 19 to 36 of the developed stator 6.

Hereinafter, "winding" refers to a wire such as a copper wire or a bundle of wires for passing a current therethrough. "Coil" refers to a joined and stacked bundle of closed annular wires that are uniform in shape.

There are three general methods for distributed winding of a motor, i.e., lap winding, concentric winding, and wave winding. Each winding method is characterized as follows.

Lap winding is a winding method in which coils with a constant pitch are overlaid. Since the coils interfere little with each other, coil ends (end portions of the coils protruding from a stator) are small in size. Lap winding is applicable to almost all winding arrangements. However, since U-phase, V-phase, and W-phase are wound by turns, lap winding is hard to perform by an automatic winding machine.

Concentric winding is a winding method in which coils are inserted in turn on a phase-by-phase basis in a radial direction. Due to a double or triple concentric coil configuration, concentric winding is obtained in a few steps using an automatic winding machine having an inserter. Concentric winding is applicable to any arbitrary winding arrangement. However, since coil ends overlap in two or three layers, the coil ends are large in size.

Wave winding is a winding method in which coils wound 360 degrees are bent into the shape of waves and inserted into slots of a stator. Connecting wires between the coils are reduced in number and length, and coil ends are reduced in size. However, wave winding has strong constraints on winding arrangements, and a winding method for fractional-slot motors has not been established yet. The present invention relates to wave winding in the fractional-slot motors.

The insertion of coils using an inserter is carried out as follows. First, coils (multi-coils) are simultaneously wound up using nozzles on some concentric spools, and inserted in the inserter. Next, the inserter is inserted into a stator to push the coils into the stator (in actuality, a guide jig to push the coils into the stator is disposed inside the inserter).

In the case of wave winding, large annular coils molded into the shape of a star are inserted in the inserter. The coils are neatly wound in motors in which the division of a slot number by a pole number is an integer. In other words, the coils are inserted into slots at a constant slot pitch, and the annular coils of the same phase are arranged in series next to each other. Connecting wires between the coils are reduced in number and length, and coil ends are reduced in size.

Although coils are wound by the wave winding in a three-phase AC motor according to the present invention, for the sake of comparison, a winding arrangement by the concentric winding will be described. FIGS. 3A and 3B are developed sectional views of a winding arrangement in the case of winding U-phase coils by concentric winding in a motor having a pole number of 10, a slot number of 36, and a shift number of 3. FIG. 3A shows the winding arrangement of coils 4 at the slot identification numbers 1 to 18. FIG. 3B shows the winding arrangement of coils 4 at the slot identification numbers 19 to 36. In each of FIGS. 3A and 3B, the upper half is a sectional view taken along a cross section perpendicular to a rotation axis of a rotor, and the lower half shows the positional relationship among the coils and slots viewed from the rotation axis of the rotor. FIGS. 3A and 3B show the arrangement of only the U-phase coils. In the upper halves of FIGS. 3A and 3B, out of areas indicated with "+u" and "−u" in each slot, the top area represents the coil in the first layer, while the bottom area represents the coil in the second layer.

Conventionally, to obtain the ten-pole thirty-six-slot winding arrangement by concentric winding, twelve coils are required per phase and the required number of insertion in the inserter is ten (double concentric windings are present at two locations). Since the double concentric windings are present only in the limited locations, the number of manufacturing steps increases. In FIGS. 3A and 3B, double-headed arrows each represent one coil made of +U and −U.

As described above, in the fractional-slot motors in which the division of a slot number by a pole number is a fraction in the lowest terms, windings become complicated and the number of manufacturing steps increases.

Next, a three-phase AC motor according to a first embodiment of the present invention will be described. FIGS. 4A to 8B show an arrangement of coils in the three-phase AC motor according to the first embodiment of the present invention. FIGS. 4A, 5A, 6A, and 7A show the arrangement of the coils at the slot identification numbers 1 to 18. FIGS. 4B, 5B, 6B, and 7B show the arrangement of the coils at the slot identification numbers 19 to 36.

The three-phase AC motor according to the first embodiment of the present invention is provided with a rotor 10 (see FIG. 1), a stator 3, and a plurality of windings 4. The rotor 10 has a plurality of pairs of magnetic poles. The stator 3 has a plurality of slots 2 each formed in the direction of a rotation axis of the rotor and arranged in a circumferential direction. The stator 3 is disposed opposite the rotor 10 in a radial direction. The plurality of windings 4 are wound in the stator 3 so as to be inserted into the slots 2. In the three-phase AC motor according to the first embodiment of the present invention, when 2P represents the number of the poles of the rotor 10 of the motor, and N represents the number of the slots 2 of the stator 3 for inserting the windings thereinto, the division of the slot number N by the number of the pole pairs P is not an integer. X represents the quotient of the division of the slot number N of the stator 3 by the number of the poles 2P. The stator 3 has a first annular winding portion 7, a second annular winding portion 8, and a plurality of third winding portions 9. The first annular winding portion 7 is made of one coil, i.e., wound a predetermined number of turns more largely than the inner diameter of the stator 3 by the winding of each phase. The first annular winding portion 7 is wound 360 degrees in the circumferential direction through the slots 2 by the wave winding at a slot pitch of X or X+1. The second annular winding portion 8 is made of another coil, i.e., wound in a like manner as the first annular winding portion 7 by the wave winding at a slot pitch of X or X+1. The second annular winding portion 8 is wound 360 degrees through the slots 2 in such a position as not to completely overlap the first annular winding portion 7 by being shifted in the circumferential direction. The plurality of third winding portions 9 are each made of the winding wound around two of the slots 2. The three-phase AC motor according to the first embodiment of the present invention is characterized in that the first annular winding portion 7, the second annular winding portion 8, and the plurality of third winding portions 9 are connected in series on a phase-by-phase basis.

Next, the first annular winding portion 7, the second annular winding portion 8, and the third winding portions 9 in the three-phase AC motor according to the first embodiment of the present invention will be described.

Figure 4A:
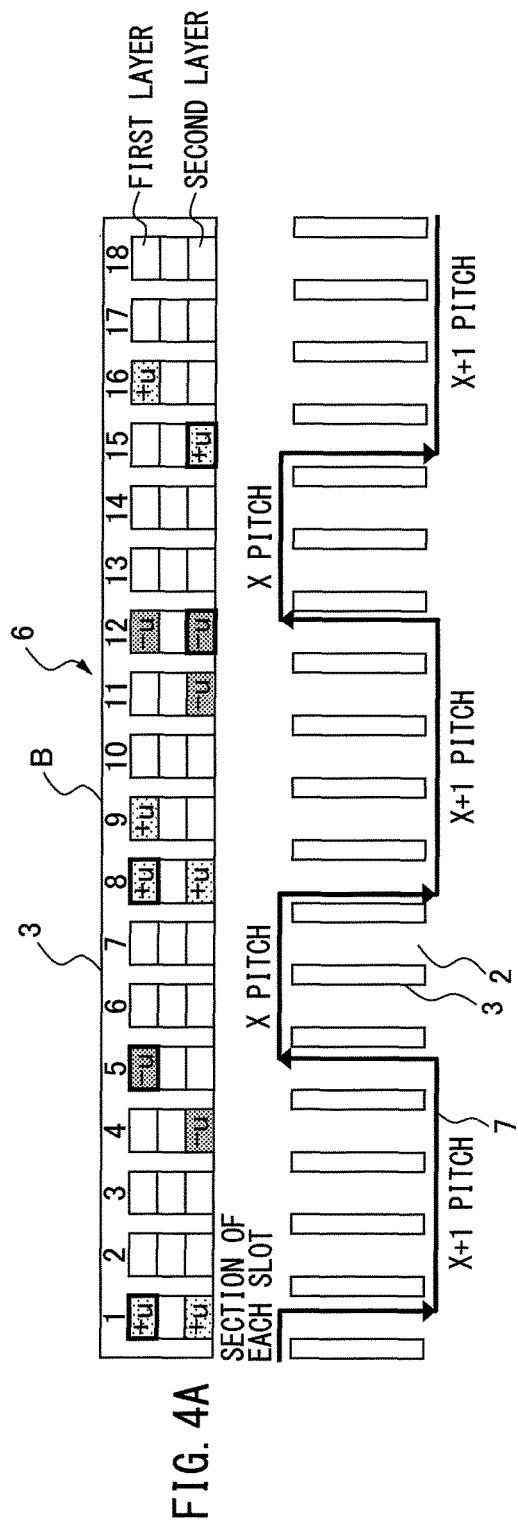
FIG. 4A is a developed sectional view of a winding arrangement at slot identification numbers 1 to 18, in the case of applying a first annular winding portion to a ten-pole thirty-six-slot wave winding in a three-phase alternating current (AC) motor according to a first embodiment of the present invention.
Figure 4B:
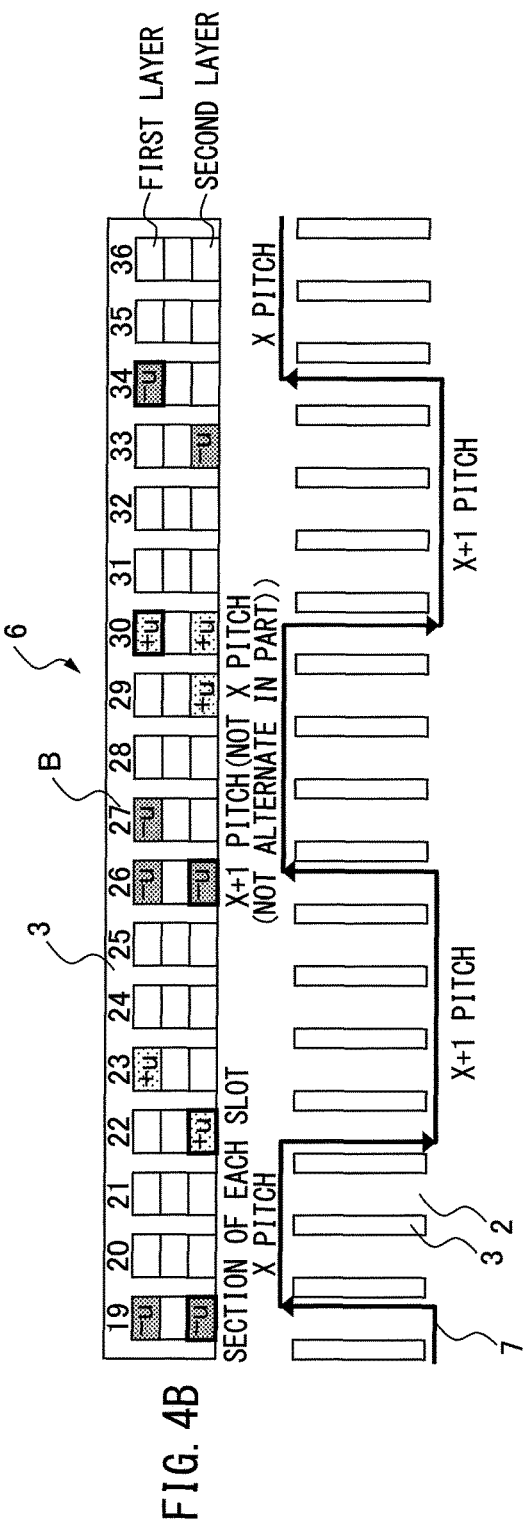
FIG. 4B is a developed sectional view of the winding arrangement at slot identification numbers 19 to 36, in the case of applying the first annular winding portion to the ten-pole thirty-six-slot wave winding in the three-phase AC motor according to the first embodiment of the present invention.

The first annular winding portion in the three-phase AC motor according to the first embodiment of the present invention will be described. FIGS. 4A and 4B show an example of application of the first annular winding portion to a ten-pole thirty-six-slot wave winding in the three-phase AC motor according to the first embodiment of the present invention. The first annular winding portion 7 in the three-phase AC motor according to the first embodiment of the present invention is characterized in that, when 2P represents the number of the poles of the rotor (see FIG. 1) and N represents the number of the slots of the stator 6 for inserting the windings thereinto, the division of the slot number N by the number of the pole pairs P is not an integer, and when X represents the quotient of the division of the slot number N of the stator by the number of the poles 2P, the single coil, i.e., wound a predetermined number of turns more largely than the inner diameter of the stator by the winding of each phase is wound 360 degrees in the circumferential direction through the slots by the wave winding at a slot pitch of X or X+1. In the example shown in FIGS. 4A and 4B, since the number of the poles 2P is 10, the number of the pole pairs P is 5. The slot number N is 36, and hence the division (36/5) of the slot number N (=36) by the number of the pole pairs P (=5) is not an integer. The quotient X of the division of the slot number N (=36) by the number of the poles 2P (=10) is 3.

To obtain the first annular winding portion 7, the coil having a diameter larger than the inner diameter of the stator is bent and wound 360 degrees by the wave winding. The coil cannot be inserted into the slots at a constant slot pitch. When X represents the quotient of the division of the slot number by the number of the poles, alternating the slot pitch between X and X+1 makes it possible to wind the coil 360 degrees by the wave winding. In the case of the ten-pole thirty-six-slot wave winding, since X=3, a portion with slot pitch of 3 and a portion with slot pitch 4 alternate in FIGS. 4A and 4B. However, slot pitches of X and X+1 may not alternate in part.

A wave winding step of the first annular winding portion 7 is as follows. First, the wave winding is wound in a combination of the slots enclosed with thick frames, out of the plurality of slots. As shown in FIGS. 4A and 4B, the first layer of the slot identification numbers 1, 5, 8, 30, and 34 and the second layer of the slot identification numbers 12, 15, 19, 22, and 26 are indicated with the thick frames. FIGS. 4A and 4B show the winding arrangement having a pole number of 10, a slot number of 36, and a shift number of 3, and the first layer and the second layer are arranged by the lap winding.

In the first layer of the slot identification numbers 30, 34, 1, 5, and 8, +U and −U are arranged alternately and repeatedly at slot pitches of 3 and 4.

In the second layer of the slot identification numbers 12, 15, 19, 22, and 26, +U and −U are arranged alternately and repeatedly at slot pitches of 3 and 4.

In the slot identification numbers 8 to 12 and 26 to 30 in which U-phase layers are gathered, the coil is wound around the slots having the slot identification numbers 8 and 12, and the slots having the slot identification numbers 26 and 30 at a slot pitch of 4.

Winding the first annular winding portion 7 by the wave winding in the ten-pole and thirty-six-slot arrangement facilitates reducing the number of the coils to be inserted in the inserter and the connecting wires between the coils.

Next, the second annular winding portion in the three-phase AC motor according to the first embodiment of the present invention will be described. FIGS. 5A and 5B show an example in which the second annular winding portion 8 in the three-phase AC motor according to the first embodiment of the present invention is applied to the ten-pole thirty-six-slot wave winding. The second annular winding portion 8 in the three-phase AC motor according to the first embodiment of the present invention is characterized in that the single coil, i.e., wound in a like manner as the first annular winding portion 7 by the wave winding at a slot pitch of X or X+1 is wound 360 degrees through the slots 2 in such a position as not to completely overlap the first annular winding portion 7 by being shifted in the circumferential direction.

To obtain the second annular winding portion 8, the wave winding is wound in the slots enclosed with thick frames in FIGS. 5A and 5B, except the slots in which the first annular winding portion 7 has been wound. When the first annular winding portion 7 of FIGS. 4A and 4B is rotated 180 degrees about the rotation axis of the rotor, the second annular winding portion 8 of FIGS. 5A and 5B coincides with the rotated first annular winding portion 7. By appropriately choosing the arrangement of the first annular winding portion 7, a coil having the same shape as the first annular winding portion 7 may be used as the second annular winding portion 8.

Next, the third winding portions in the three-phase AC motor according to the first embodiment of the present invention will be described. FIGS. 6A and 6B show an example in which the third winding portions 9 in the three-phase AC motor according to the first embodiment of the present invention is applied to the ten-pole thirty-six-slot wave winding. The third winding portion 9 in the three-phase AC motor according to the first embodiment of the present invention is characterized in that the winding is wound around two of the slots.

As shown in FIGS. 6A and 6B, as the third winding portions 9, a single coil is disposed in the slot identification numbers 9 and 11 and another single coil is disposed in the slot identification numbers 27 and 29, aside from the first annular winding portion 7 and the second annular winding portion 8. In FIGS. 6A and 6B, the first annular winding portion 7, the second annular winding portion 8, and the third winding portions 9 are connected in series. The V-phase and W-phase windings can be wound in the same manner by arranging the first annular winding portions, the second annular winding portions, and the plurality of third winding portions in positions that are ±120 degrees rotationally symmetrical, respectively. In FIG. 6A, reference numeral 71 indicates a connecting wire between the first annular winding portion 7 and the second annular winding portion 8. Reference numeral 82 indicates a connecting wire between the second annular winding portion 8 and the third winding portion 9. Reference numeral 91 indicates a U-phase lead wire. In FIG. 6B, reference numeral 72 indicates a connecting wire between the first annular winding portion 7 and the third winding portion 9. In this manner, all the windings are wound in the winding arrangement shown in FIGS. 2A and 2B.

Figure 7A:
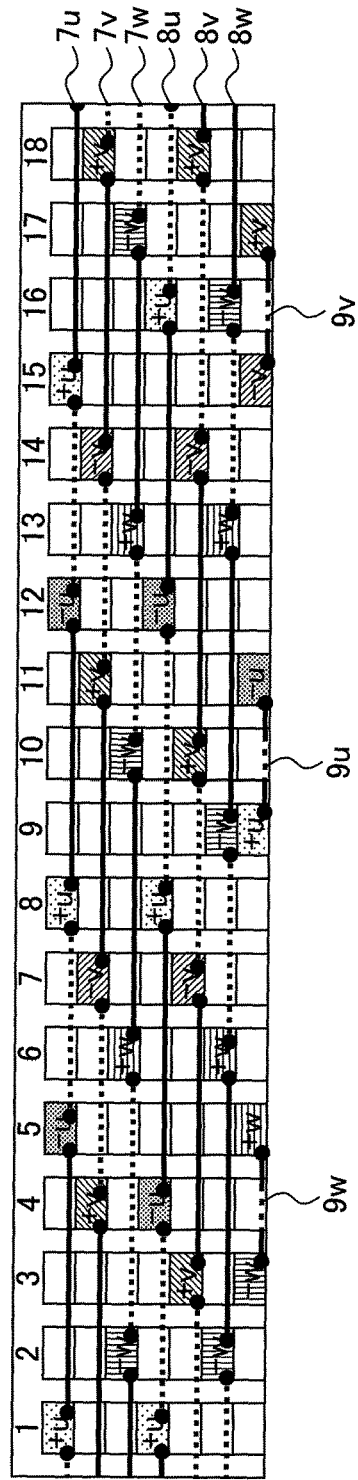
FIG. 7A is a developed sectional view of a winding arrangement at the slot identification numbers 1 to 18 when three phase coils consisting of U-, V-, and W-phases are inserted, in the case of applying third winding portions to the ten-pole thirty-six-slot winding arrangement in the three-phase AC motor according to the first embodiment of the present invention.
Figure 7B:
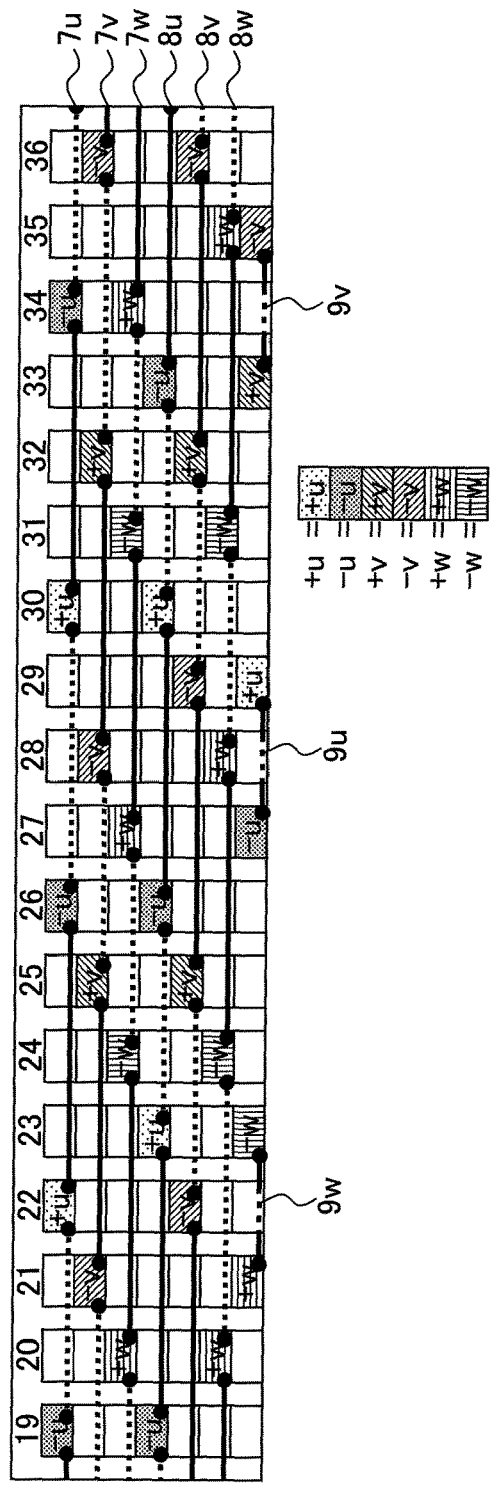
FIG. 7B is a developed sectional view of the winding arrangement at the slot identification numbers 19 to 36 when three phase coils consisting of U-, V-, and W-phases are inserted, in the case of applying third winding portions to the ten-pole thirty-six-slot winding arrangement in the three-phase AC motor according to the first embodiment of the present invention.

FIGS. 7A and 7B are developed views of a winding arrangement when three phase coils consisting of U-, V-, W-phases are inserted, in the case of applying the third winding portions to the ten-pole thirty-six-slot winding arrangement in the three-phase AC motor according to the first embodiment of the present invention. In FIGS. 7A and 7B, 7u indicates a U-phase first annular winding portion, 7v indicates a V-phase first annular winding portion, and 7w indicates a W-phase first annular winding portion. Likewise, 8u indicates a U-phase second annular winding portion, 8v indicates a V-phase second annular winding portion, and 8w indicates a W-phase second annular winding portion. Likewise, 9u indicates U-phase third winding portions, 9v indicates V-phase third winding portions, and 9w indicates W-phase third winding portions. Furthermore, in FIGS. 7A and 7B, solid lines indicate crossover portions on a top side of the drawings, dotted lines indicate crossover portions on a bottom side of the drawings, and long and short dashed lines indicate the third winding portions. FIGS. 7A and 7B show an example in which the three-phase windings are inserted in the arrangement shown in FIGS. 6A and 6B, and more specifically speaking, the first annular winding portions 7u to 7w and the second annular winding portions 8u to 8w are inserted in the order of U, V, and W, and the third winding portions 9u to 9w are inserted lastly. Connecting wires and lead wires are omitted in FIGS. 7A and 7B. In FIGS. 7A and 7B, six annular coils are identical to each other, and arranged while being shifted by six slots.

As another example of the three-phase AC motor according to the first embodiment of the present invention, an example in which the present invention is applied to a four-pole fifteen-slot wave winding will be described. FIGS. 8A and 8B are developed sectional views in a case where the first annular winding portion, the second annular winding portion, and the third winding portion are applied to a four-pole fifteen-slot winding arrangement in the three-phase AC motor according to the first embodiment of the present invention. FIG. 8A shows a sectional view taken along a cross section perpendicular to the rotation axis of the rotor. FIG. 8B shows the positional relationship among coils and slots viewed from the rotation axis of the rotor. In FIGS. 8A and 8B, reference numeral 20 indicates the slots in the stator core, reference numeral 30 indicates the stator core, reference numeral 60 indicates the stator, and B indicates slot identification numbers. FIG. 8B shows a first annular winding portion 70, a second annular winding portion 80, and a third winding portion 90 for a U-phase winding, though connecting wires and a lead wire are omitted.

As described above, according to the three-phase AC motor of the first embodiment of the present invention, it is possible to obtain a motor having a winding configuration that can be automatically wound in a small number of manufacturing steps, even though the motor is a fractional-slot motor, which can expect a reduction of torque ripple but has a complicated winding configuration.

Second Embodiment

Next, a three-phase AC motor according to a second embodiment of the present invention will be described. In a stator of the three-phase AC motor according to the second embodiment of the present invention, the second annular winding portion 8 has the same shape as the first annular winding portion 7 and is arranged in a position, i.e., shifted from the first annular winding portion 7. FIGS. 5A and 5B show an example in which the second annular winding portion 8 in the three-phase AC motor according to the present invention is applied to the ten-pole thirty-six-slot wave winding.

Alternatively, like a crossover portion 81' of a second annular winding portion 8' in a stator 6' of the three-phase AC motor according to the second embodiment of the present invention shown in FIGS. 9A and 9B, a crossover portion 81 of the second annular winding portion 8 shown in FIGS. 5A and 5B may be inverted in orientation. In FIGS. 5A and 5B, the first annular winding portion 7 and the second annular winding portion 8 through which currents pass in opposite directions intersect with each other at crossover portions between slot identification numbers 4 and 5, between slot identification numbers 15 and 16, between slot identification numbers 22 and 23, and between slot identification numbers 33 and 34. Thus, if a high load voltage is applied, for example, an insulating member is required to be interposed in the crossover portions.

On the other hand, in FIGS. 9A and 9B, since the second annular winding portion 8' is on the opposite side to the first annular winding portion 7 at the crossover portions, the first annular winding portion 7 and the second annular winding portion 8' do not intersect with each other while passing currents in opposite directions. Thus, it is possible to eliminate the need for providing the insulating member (e.g. insulating sheet) between the first annular winding portion 7 and the second annular winding portion 8'.

However, since crossover portions of the two annular winding portions partly overlap each other, coil ends are larger in size than in FIGS. 5A and 5B. Also, the second annular winding portion 8' is different in shape from the first annular winding portion 7. Thus, even if the second annular winding portion 8' is rotated by 180 degrees, the rotated second annular winding portion does not coincide with the first annular winding portion 7.

Depending on a use application, the crossover portions of the second annular winding portion are selectable between those (81) shown in FIGS. 5A and 5B and those (81') shown in FIGS. 9A and 9B. For example, small-size or low-power motors may use the second annular winding portion 8 having the crossover portion 81 as shown in FIGS. 5A and 5B, while high-power motors may use the second annular winding portion 8' having the crossover portion 81' as shown in FIGS. 9A and 9B.

Third Embodiment

Next, a three-phase AC motor according to a third embodiment of the present invention will be described. FIGS. 10A and 10B show an example of a stator 6" in which third winding portions are applied to the ten-pole thirty-six-slot winding arrangement in the three-phase AC motor according to the third embodiment of the present invention. In the stator of the three-phase AC motor according to the third embodiment of the present invention, a plurality of third winding portions 9' are each characterized in that a coil, i.e., formed by twisting a part of the first annular winding portion 7 or a part of the second annular winding portion 8 and wound around the slots.

Figure 11A:
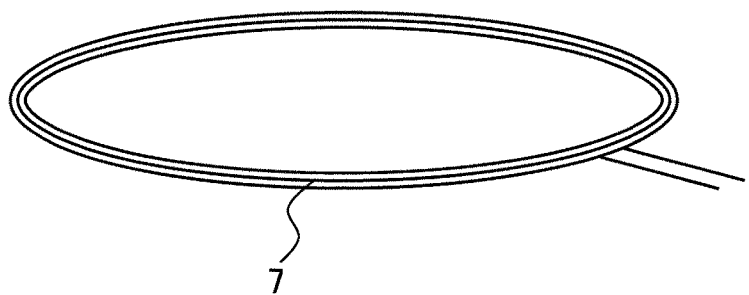
FIG. 11A is a drawing for explaining the state of a first annular winding portion before being twisted, in the step of twisting a part of a coil to form the third winding portion in the three-phase AC motor according to the third embodiment of the present invention.
Figure 11B:
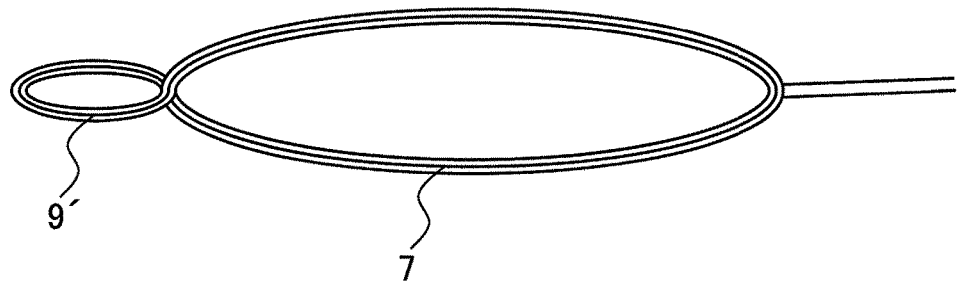
FIG. 11B is a drawing for explaining a state in which the third winding portion is formed by twisting a part of the first annular winding portion, in the step of twisting a part of a coil to form the third winding portion in the three-phase AC motor according to the third embodiment of the present invention.

FIG. 11A shows the state of the first annular winding portion 7 before being twisted, and FIG. 11B shows a state in which the third winding portion 9' is formed by twisting a part of the first annular winding portion 7. As shown in FIGS. 11A and 11B, the single coil as shown in FIGS. 6A and 6B may be made by twisting a part of the annular wound coil.

The above embodiments describe the ten-pole thirty-six-slot motors having a pole number of 10 and a slot number of 36, as an example. However, the present invention is not limited to this example, but is applicable to motors having another pole number and another slot number as long as, when 2P represents the number of poles and N represents a slot number, the division of the slot number N by the number of pole pairs P is not an integer.

As described above, according to the three-phase AC motors according to the embodiments of the present invention, it is possible to obtain a three-phase AC motor having a winding configuration that can be automatically wound in a small number of manufacturing steps, even though the motor is a fractional-slot motor, which can expect a reduction of torque ripple but has a complicated winding configuration.

What is claimed is:

1. A three-phase alternating current motor comprising:
   a rotor having a plurality of pairs of magnetic poles;
   a stator having a plurality of slots each formed in the direction of a rotation axis of the rotor and arranged in a circumferential direction, the stator is disposed opposite the rotor in a radial direction; and
   a plurality of windings wound in the stator so as to be inserted into the slots, wherein
   when 2P represents the number of the poles of the rotor and N represents the number of the slots for inserting the windings of the stator therethrough, the division of the slot number N by the number of the pole pairs P is not an integer,
   when X represents the quotient of the division of the slot number N of the stator by the number of the poles 2P, the stator includes:
   a first annular winding portion made of one set of coils, i.e., wound a predetermined number of turns having a diameter larger than the inner diameter of the stator by the winding of each phase, the first annular winding portion is wound 360 degrees in the circumferential direction through the slots by wave winding at alternating slot pitches such that the first annular winding portion has at least two adjacent slot pitches corresponding to X and X+1, respectively;
   a second annular winding portion made of another coil, i.e., wound in a like manner as the first annular winding portion by the wave winding at alternating slot pitches such that the second annular winding portion has at least two adjacent slot pitches corresponding to X and X+1, respectively,
   the second annular winding portion is wound in the position not to coincide with the first annular winding portion; and
   a plurality of third winding portions each made of the one or more wires distinct from the wires of the first annular winding portion and the second annular winding portion, the one or more wires of the third winding portions being wound around two of the slots, and
   the first annular winding portion, the second annular winding portion, and the plurality of third winding portions are connected in series on a phase-by-phase basis.

2. The three-phase alternating current motor according to claim 1, wherein in the stator of the motor, the second annular winding portion has the same shape as the first annular winding portion and is shifted in position from the first annular winding portion.

3. The three-phase alternating current motor according to claim 1, wherein in the stator of the motor, the plurality of third winding portions is each made of a coil, i.e., formed by twisting a part of the first annular winding portion or a part of the second annular winding portion and wound around the slots.

* * * * *